(12) United States Patent
Inaba et al.

(10) Patent No.: US 8,549,777 B2
(45) Date of Patent: Oct. 8, 2013

(54) METHOD FOR MANUFACTURING LIGHT GUIDE PLATE, LIGHT GUIDE PLATE, AND LIGHT EMITTING SIGN USING THE LIGHT GUIDE PLATE

(75) Inventors: Tatsuya Inaba, Aichi (JP); Noboru Iwanaga, Aichi (JP)

(73) Assignee: S. K. G. Co., Ltd., Aichi (JP)

( * ) Notice: Subject to any disclaimer, the term of this patent is extended or adjusted under 35 U.S.C. 154(b) by 835 days.

(21) Appl. No.: 12/733,463

(22) PCT Filed: Dec. 12, 2008

(86) PCT No.: PCT/JP2008/072705
§ 371 (c)(1),
(2), (4) Date: Mar. 3, 2010

(87) PCT Pub. No.: WO2009/078368
PCT Pub. Date: Jun. 25, 2009

(65) Prior Publication Data
US 2010/0180479 A1    Jul. 22, 2010

(30) Foreign Application Priority Data

Dec. 14, 2007   (JP) ................................. 2007-323888

(51) Int. Cl.
*G09F 13/18*         (2006.01)
(52) U.S. Cl.
USPC ............. 40/546; 362/617; 362/619; 264/1.24

(58) Field of Classification Search
USPC ............ 40/546; 362/615, 617, 619; 264/1.24
See application file for complete search history.

(56) References Cited

U.S. PATENT DOCUMENTS

| | | | | |
|---|---|---|---|---|
| 5,461,547 A  * | 10/1995 | Ciupke et al. | ................. | 362/617 |
| 5,625,968 A  * |  5/1997 | Ashall | .............................. | 40/546 |
| 6,592,233 B1 * |  7/2003 | Parikka | ........................ | 362/600 |
| 6,836,303 B2 * | 12/2004 | Kim | ................................ | 349/65 |
| 7,128,459 B2 * | 10/2006 | Igarashi et al. | ................ | 362/621 |
| 2003/0214719 A1* | 11/2003 | Bourdelais et al. | ........... | 359/599 |
| 2004/0227262 A1* | 11/2004 | Kim | ............................. | 264/1.24 |
| 2006/0021267 A1* |  2/2006 | Matsuda et al. | ................ | 40/546 |
| 2007/0285946 A1* | 12/2007 | Lin et al. | ....................... | 362/615 |
| 2012/0182766 A1* |  7/2012 | Sakamoto et al. | ............ | 362/615 |

FOREIGN PATENT DOCUMENTS

| | | |
|---|---|---|
| JP | 09-114407 A | 5/1997 |
| JP | 2007-042562 A | 2/2007 |
| JP | 2007-066699 A | 3/2007 |
| JP | 2007-299716 A | 11/2007 |
| JP | 2010257846 A  * | 11/2010 |
| JP | 2012148567 A  * | 8/2012 |
| WO | WO 2010125603 A1 * | 11/2010 |

* cited by examiner

*Primary Examiner* — Gary Hoge
(74) *Attorney, Agent, or Firm* — Rabin & Berdo, P.C.

(57) ABSTRACT

The present invention reduces generation of unevenness on a surface by adjusting unevenness of a reflection pattern in a case where the reflection pattern is formed by an ultrasonic process.

4 Claims, 12 Drawing Sheets

METHOD FOR MANUFACTURING LIGHT GUIDE PLATE, LIGHT GUIDE PLATE, AND LIGHT EMITTING SIGN USING THE LIGHT GUIDE PLATE

TECHNICAL FIELD

The present invention relates to a method for manufacturing a light guide plate, to the light guide plate, and to a light emitting sign using the light guide plate.

BACKGROUND ART

A related art light guide plate has been known to receive the incident light entered from an end surface thereof to emit the light from both main surfaces thereof. For example, Patent Document 1 discloses such a related art light guide plate for use in an illuminating device.

Patent Document 1: Japanese Unexamined Patent Application Publication No. 2007-299716

Particularly, the illuminating device disclosed in Patent Document 1 includes the light guide plate, a first display panel, and a second display panel. The first and second display panels are disposed in such a manner as to sandwich the light guide plate therebetween. The illuminating device allows the incident light entered into the light guide plate from a light source, such as a light emitting diode (LED) disposed on the end surface of the light guide plate, to be emitted from the both main surfaces of the light guide plate, so that the light is irradiated from back of the first and second display panels.

In a case where such an illuminating device is applied to a relatively large device such as a liquid crystal monitor and a light emitting sign, however, an amount of the light emitted from the light guide plate is not sufficient, causing difficulty of fulfilling a function thereof. As a method for increasing the amount of the light to be emitted from such a light guide plate, a method has been known for forming a reflection pattern on a light guide plate by an ultrasonic process as an invention set forth in Patent Document 2. In a case of forming the reflection pattern, an ultrasonic process horn is attached to a prescribed ultrasonic processing machine, so that a light guide plate workpiece is allowed to contact the ultrasonic process horn for plural times to form the reflection pattern.

Patent Document 2: Japanese Unexamined Patent Application Publication No. 2007-66699

DISCLOSURE OF THE INVENTION

Problems to be Solved by the Invention

In a case where such a reflection pattern is formed by the ultrasonic process, an ultrasonic process horn 101 as illustrated in FIG. 12 is allowed to contact the light guide plate workpiece, thereby forming the reflection pattern. In consideration of, e.g., an output of the ultrasonic process horn 101, a size of a process portion of the horn cannot be greater than a certain size, and therefore, the ultrasonic process horn 101 repeatedly contacts the light guide plate workpiece in a case of forming the reflection patterns across the light guide plate workpiece. For example, after the ultrasonic process horn 101 contacts a process surface of the light guide plate workpiece once, the ultrasonic process horn 101 moves in a direction "A" indicated by an arrow shown in FIG. 13 (a) from the upper left of the process surface of the light guide plate workpiece 103 and again contacts the process surface of the light guide plate workpiece 103 as illustrated in FIG. 13 (a).

Herein, the ultrasonic process horn 101 moves in such a manner that each of the reflection patterns adjacent to each other does not overlap another, thereby performing the process. Upon reaching a right end of the light guide plate workpiece 103, the ultrasonic process horn 101 moves in a downward direction of a light guide plate 3, thereby performing the process while moving towards a right side from a left side of the light guide plate 3 (i.e., in a direction "B" indicated by an arrow shown in FIG. 13(a)). Accordingly, such a series of processes forms the light guide plate having the reflection patterns across the surface thereof as illustrated in FIG. 13 (b).

When the incident light is entered into one end surface of the light guide plate on which such a series of processes is performed, the light guide plate emits the light as illustrated in FIG. 14. The light guide plate as shown in a photograph of FIG. 14 includes a main surface having a diffusion plate disposed thereon. As apparent from FIG. 14, blurred lines are generated across the vertical direction and the horizontal direction on a surface of the light guide plate. These lines are referred to as process marks generated during the process performed by the ultrasonic process horn 101. That is, in a case where the ultrasonic process horn 101 is slightly inclined, the reflection patterns to be formed on the surface of the light guide plate can loose uniformity or evenness in size due to which the size of the ultrasonic process horn 101 is relatively large compared to that of each reflection pattern. Consequently, the reflection patterns with such unevenness causes unevenness on the surface of the light guide plate in a case where the incident light is entered into the light guide plate having the reflection patterns each of which has an unevenness in size.

The present invention is proposed in consideration of the aforementioned conventional situations and is intended to provide a method for manufacturing a light guide plate, the light guide plate, and a light emitting sign using the light guide plate capable of reducing unevenness on a surface of the light guide plate by adjusting the unevenness of the reflection patterns in a case of forming the reflection patterns by an ultrasonic process.

Means for Solving the Problem

In consideration of the aforementioned conventional situations, a method for manufacturing a light guide plate according to the present invention is provided. The method for manufacturing a light guide plate emitting incident light entered from an end surface thereof from a main surface thereof includes: a forming step forming a recessed portion group having a plurality of recessed portions deflecting a traveling direction of the incident light entered from the end surface by allowing a prescribed ultrasonic process horn to contact the main surface of the light guide plate; and an adjusting step adjusting sizes of the plural recessed portions forming the recessed portion group to be substantially uniform by allowing the ultrasonic process horn to contact the recessed portion group formed on the main surface of the light guide plate by the forming step.

Accordingly, sizes of the recessed portions formed on the light guide plate by the forming process are adjusted in such a manner as to be substantially uniform. Therefore, the light guide plate emits light uniformly.

Advantages of the Invention

The present invention can reduce the unevenness on the surface by adjusting the unevenness of the recessed portions.

EXPLANATION OF NUMERALS

Figure 1:
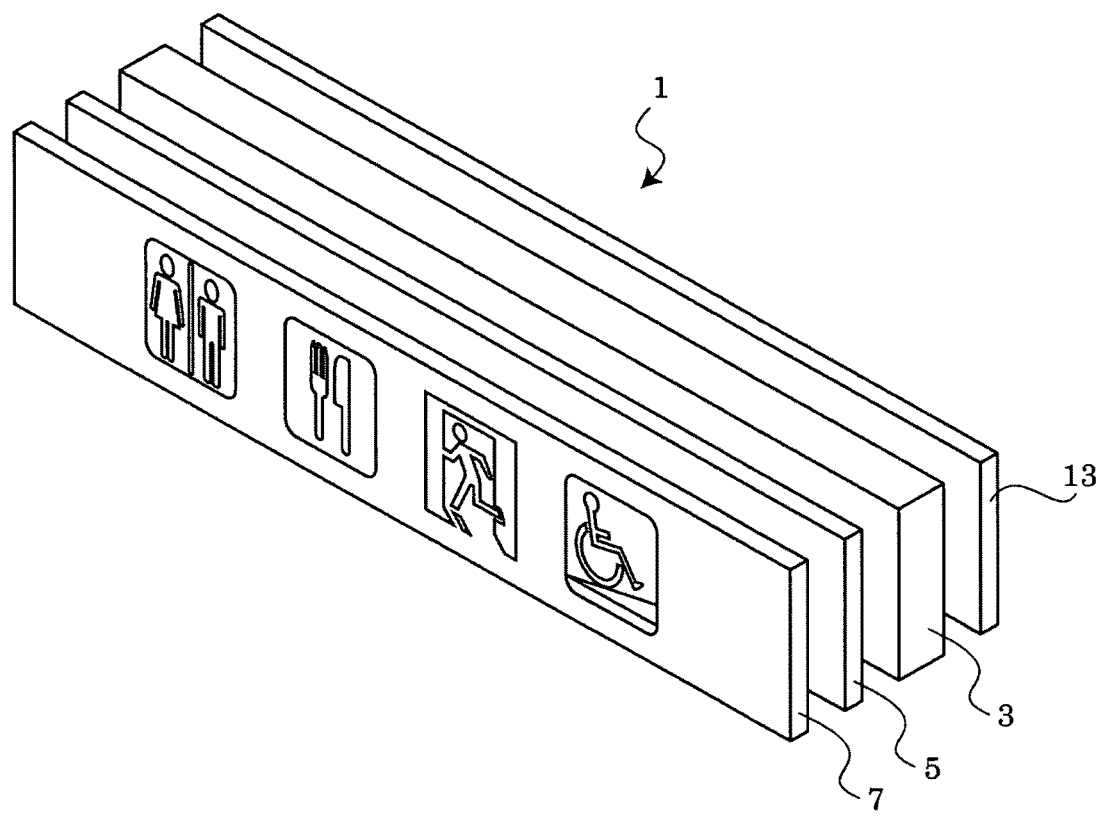
FIG. 1 is a perspective view illustrating a light emitting sign.

1. Light emitting sign
3. Light guide plate
5. Diffusion plate
7. Display plate
9. Light guide plate workpiece
11. Recessed portion
13. Reflection plate
101. Ultrasonic process horn
103. Light guide plate workpiece
105. Process dot

BEST MODE FOR CARRYING OUT THE INVENTION

A light emitting sign 1 according to an embodiment includes a light guide plate 3, a diffusion plate 5, and a display plate 7 as illustrated in FIG. 1. The light emitting sign 1 allows the incident light entered from a side surface of the light guide plate 3 to emit from a main surface of the light guide plate 3. Subsequently, the light emitted from the main surface of the light guide plate 3 is diffused by the diffusion plate 5, and is irradiated from the back of the display plate 7.

Figure 2:
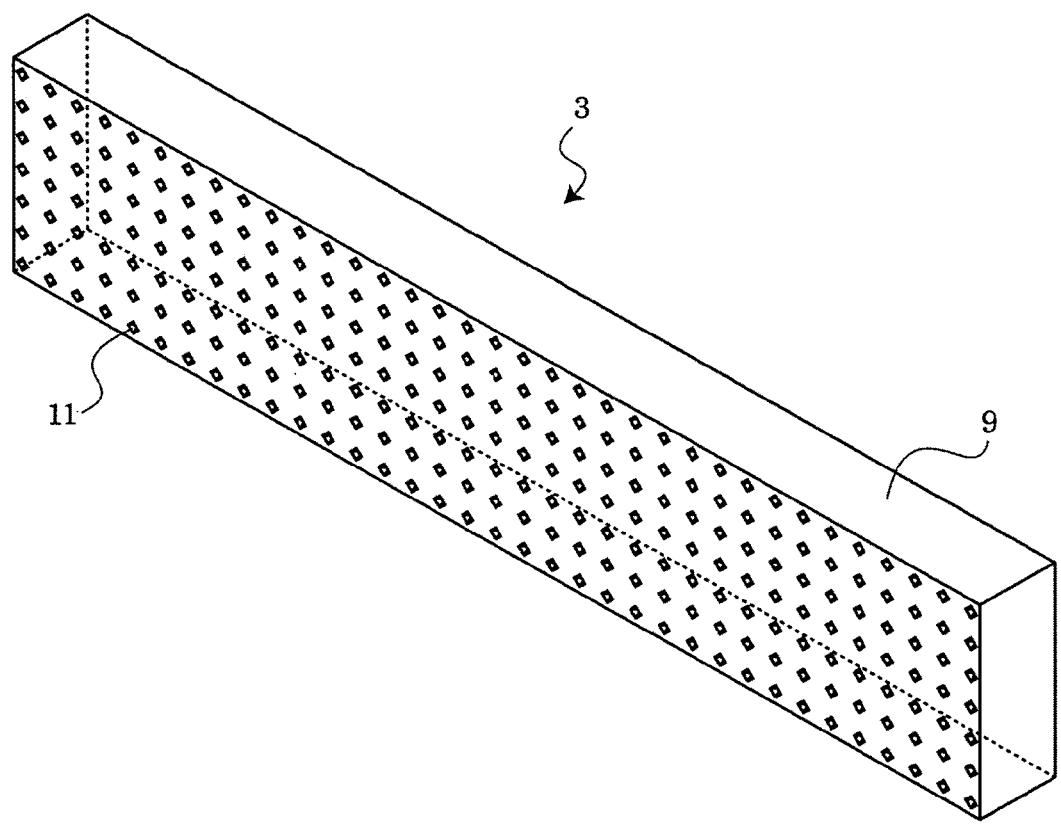
FIG. 2 is a perspective view illustrating a light guide plate.

The light guide plate 3 is formed by processing a plurality of recessed portions 11 on a surface of a light guide plate workpiece 9, for example, made of an acrylic plate having a prescribed size, as illustrated in FIG. 2. The recessed portions 11 deflect a traveling direction of the incident light entered from the end surface of the light guide plate 3 into the light guide plate 3. The recessed portions 11 are formed by an ultrasonic process.

Figure 12:
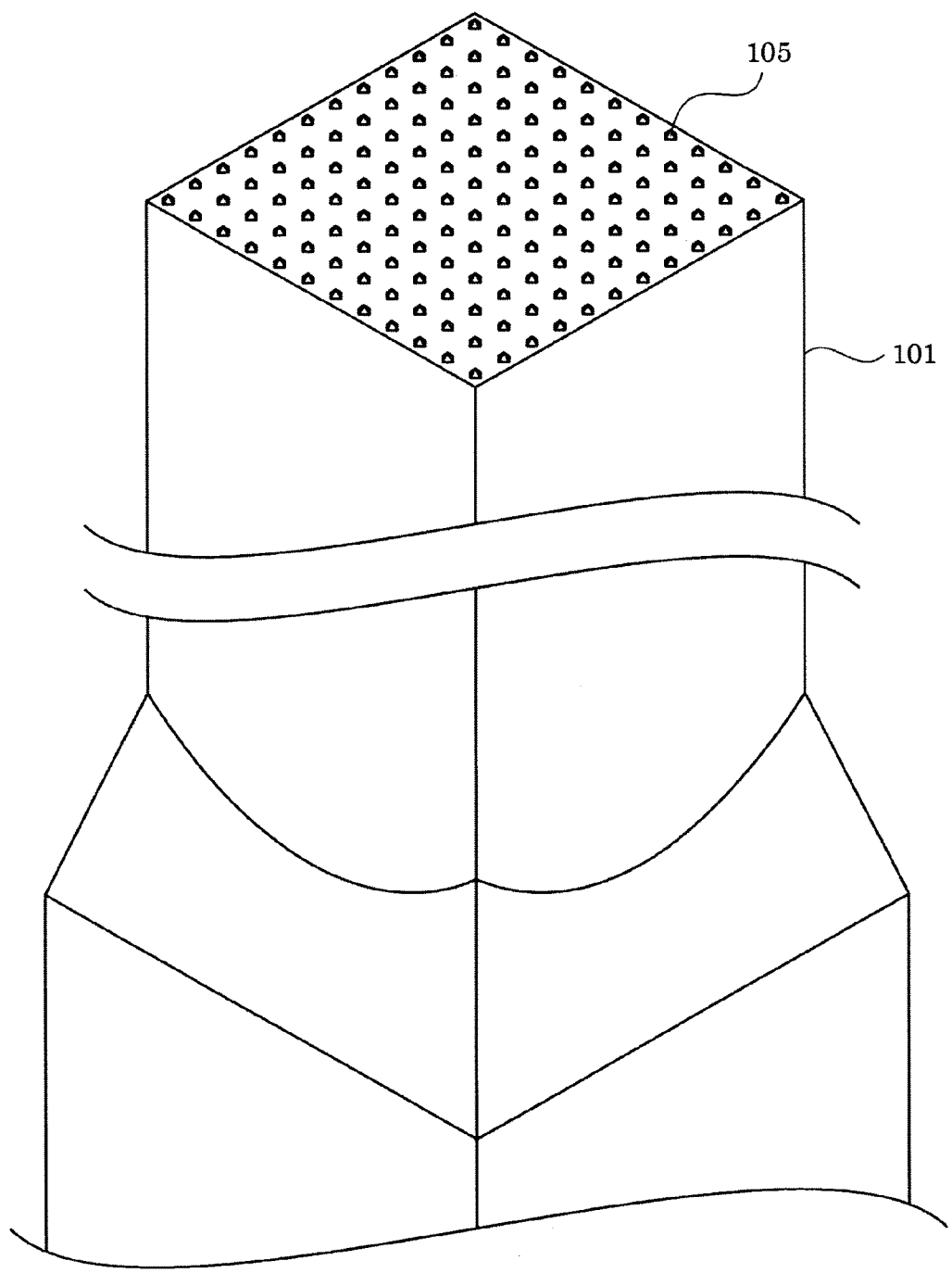
FIG. 12 is an enlarged perspective view illustrating an ultrasonic process horn.

An ultrasonic processing machine for used in forming the recessed portions 11 includes an ultrasonic process horn 101 as illustrated in FIG. 12. The ultrasonic process horn 101 includes a leading end having a plurality of process dots 105 formed thereto, and the process dots 105 correspond to the recessed portions 11. Each of the process dots 105 is a quadrangular pyramid shape having, for example, a height of approximately 0.3 mm. Each of the process dots 105 includes a bottom surface having a diagonal length of approximately 1.8 mm. The process dots 105 are arranged in an even number in each of the vertical direction and horizontal direction on the leading end of the ultrasonic process horn 101. The movement of the ultrasonic process horn 101 by a prescribed carrier allows each of the process dots 105 to contact the surface of the light guide plate workpiece 9, so that the recessed portions 11 (for example, the number of the recessed portions 11 is 144 calculated by 12×12) are formed on the surface of the light guide plate workpiece 9. Where the light guide plate 3 is manufactured, the leading end of the ultrasonic process horn 101 is allowed to contact the light guide plate workpiece 9 to form one hundred forty four (144) recessed portions 11; the ultrasonic process horn 101 is then separated from the light guide plate workpiece 9 to make a parallel shift; and the ultrasonic process horn 101 is again allowed to contact the light guide plate workpiece 9. Such procedures are repeatedly performed, so that the recessed portions 11 are uniformly formed across the surface of the light guide plate 3.

A reflection plate 13 is provided on another main surface opposite to the main surface having the recessed portions 11 in the light guide plate 3. The reflection plate 13 is formed by, for example, adhesion of a polycarbonate film onto the another main surface of the light guide plate 3. Accordingly, the reflection plate 13 reflects the light led to the side of the another main surface inside the light guide plate 3 in a direction of the recessed portions 11.

Figure 3:
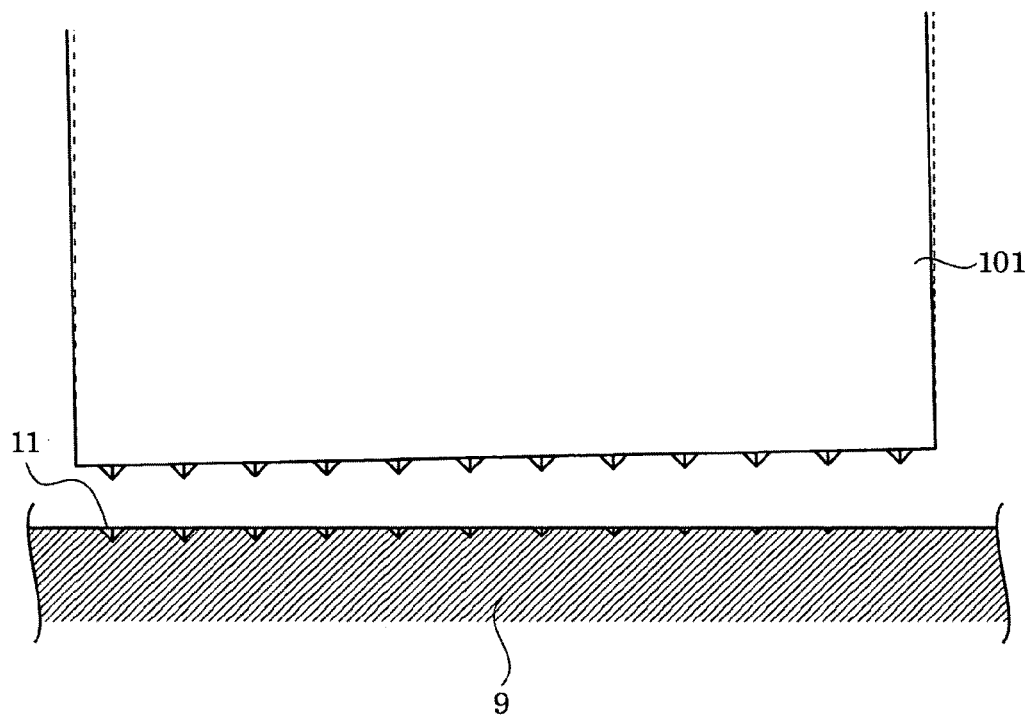
FIG. 3 is an enlarged cross-sectional view illustrating the light guide plate in a case of manufacturing thereof.
Figure 4:
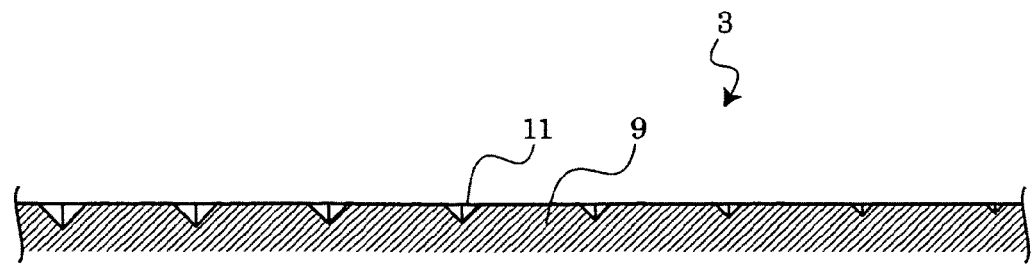
FIG. 4 is an enlarged cross-sectional view illustrating the light guide plate.
Figure 14:
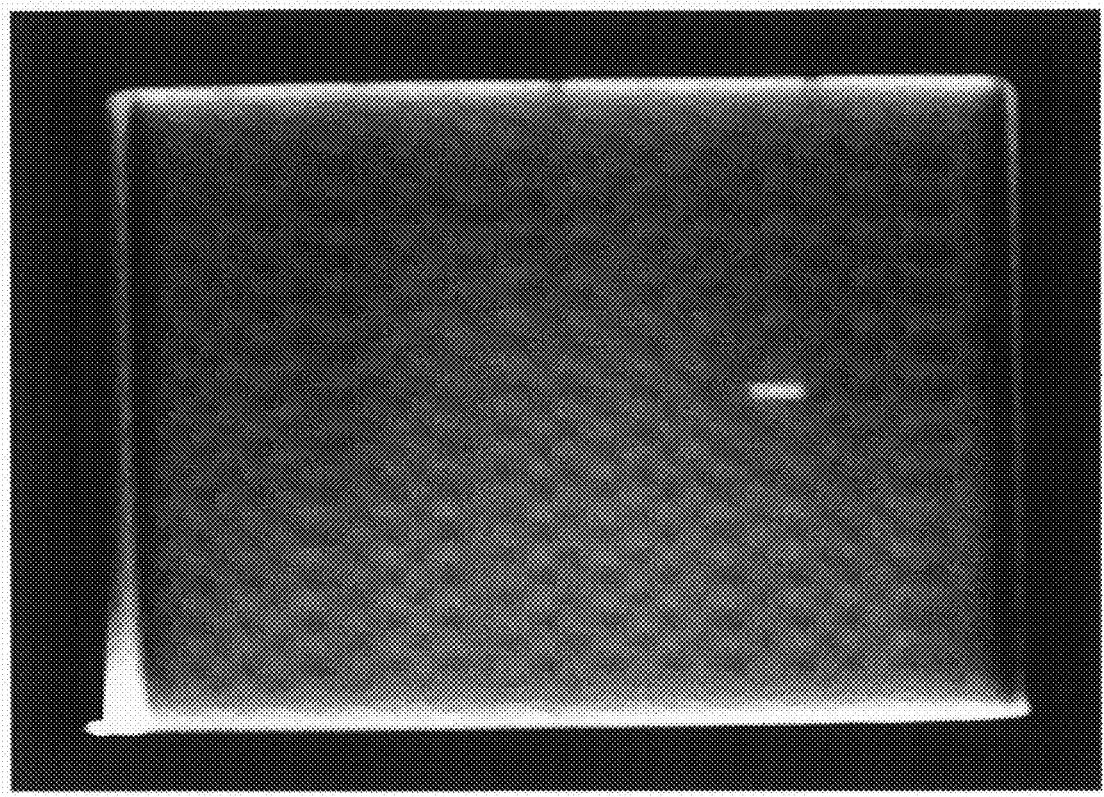
FIG. 14 is a photograph illustrating a state that a related art light guide plate emits the light.

The ultrasonic process horn 101, for example, can be manually secured to the carrier by an operator. In a case of the manual securement, however, accurate securement of the ultrasonic process horn 101 may be difficult. Since the size of each recessed portion 11 is very small as above, each of the recessed portions 11 is unevenly formed in a case where the ultrasonic process horn 101 is secured in a slightly misaligned manner. For example, in a case where an axis of the ultrasonic process horn 101 is inclined as illustrated in FIG. 3, the recessed portions 11 are unevenly formed as illustrated in FIG. 4. Particularly, the sizes of the recessed portions 11 formed in a direction to which the ultrasonic process horn 101 is inclined become larger among the plurality thereof. The farther from the inclination direction, the smaller the size of the recessed portion 11. Consequently, the plural recessed portions 11 are suffered from unevenness in depth, causing the unevenness of the light to be emitted from the light guide plate as illustrated in FIG. 14. Particularly, in a case where the light guide plates are manufactured in a large volume, the inclination of the ultrasonic process horn 101 slightly fluctuates with respect to each contact with the light guide plate workpiece 9, causing a phenomenon of such unevenness.

Therefore, it is an object of the present invention to reduce an occurrence of the unevenness of the light even where the ultrasonic process horn 101 is slightly inclined.

Figure 5:
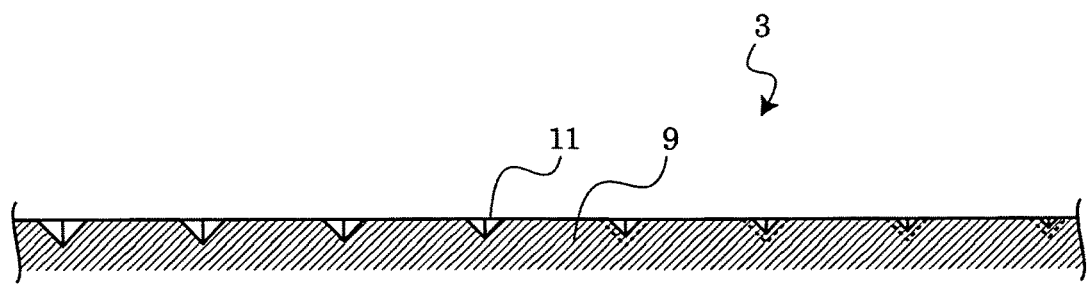
FIG. 5 is an enlarged cross-sectional view illustrating the light guide plate.

According to the method for manufacturing the light guide plate of the present invention, the recessed portions 11 are formed using the ultrasonic process horn 101 once, and then the sizes of the recessed portions 11 are adjusted using the ultrasonic process horn 101 again. In other words, according to the present invention, the light guide plate workpiece 9 is touched by the ultrasonic process horn 101 twice, so that the recessed portions are formed and then adjusted. In a case where the sizes of the recessed portions 11 are adjusted, the ultrasonic process horn 101 is allowed to contact the light guide plate work piece 9 after moving to a position different from a position used during formation of the recessed portions 11. Accordingly, the size of the recessed portion 11 being relatively small is increased, so that the size of each recessed portion 11 becomes relatively uniform as illustrated in FIG. 5. In a case of adjusting the sizes of the recessed portions 11, the ultrasonic process horn 101 moves to the position not only different from the position used in a case of forming the recessed portions 11, but also in such a manner that the process dots overlap the recessed portions 11 already formed, thereby adjusting the sizes of the recessed portions 11.

Figure 6:
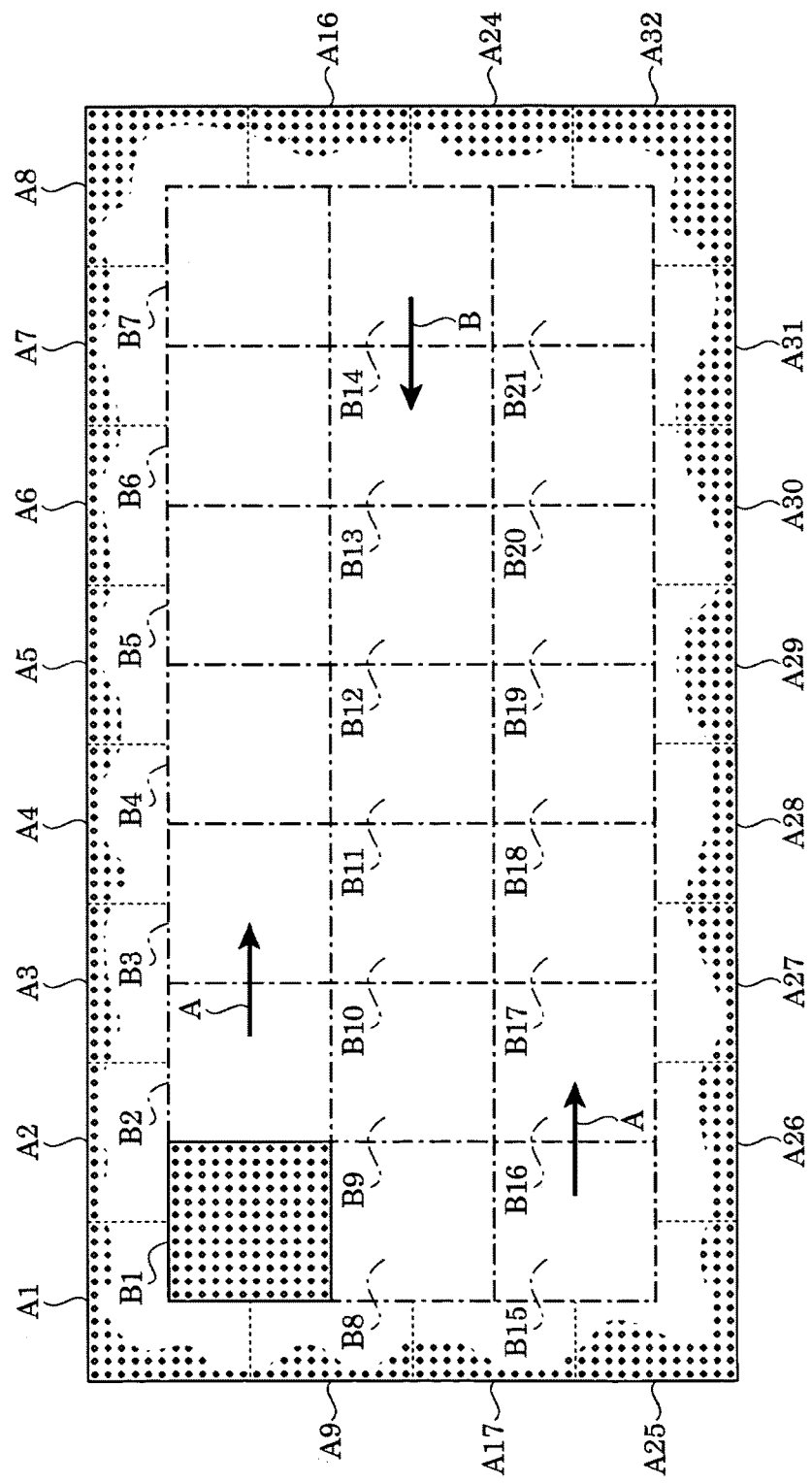
FIG. 6 is a plan view illustrating the light guide plate.
Figure 7:
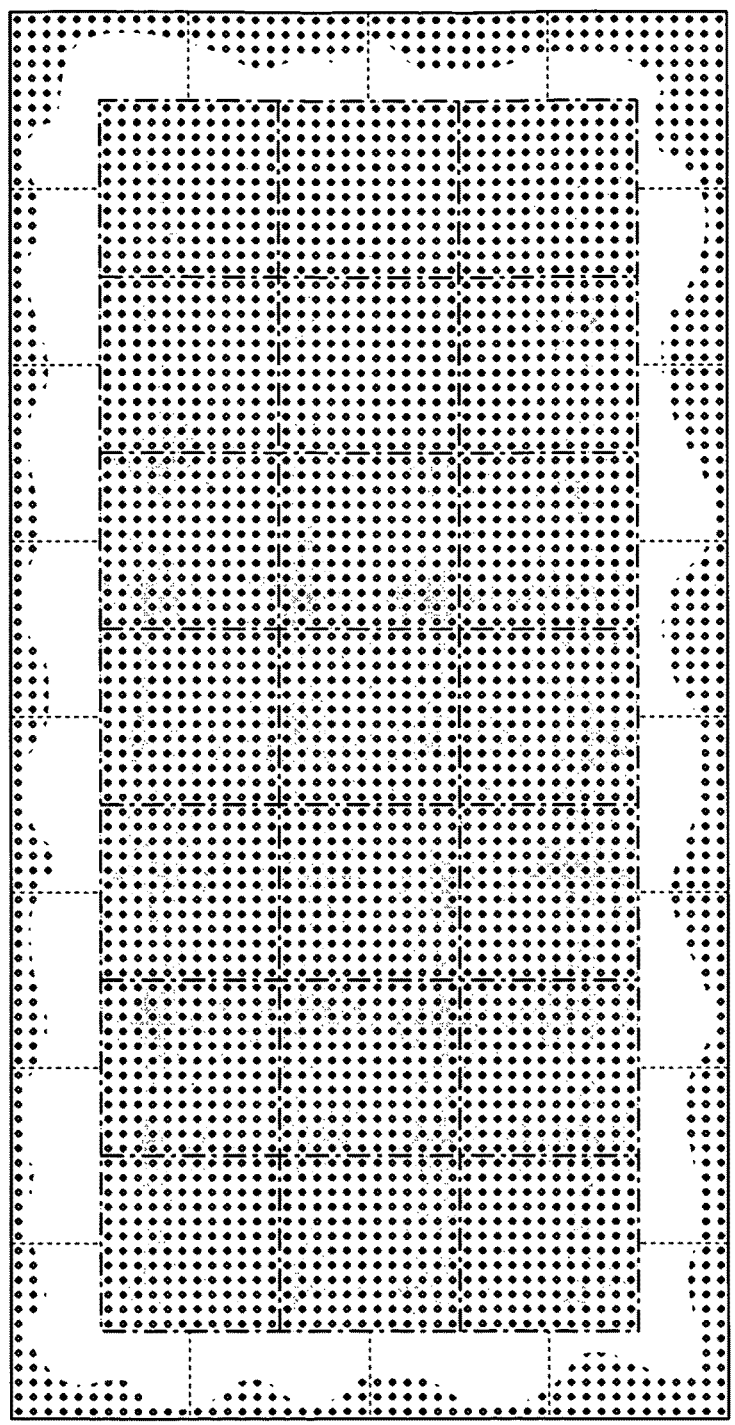
FIG. 7 is a plan view illustrating the light guide plate.
Figure 8:
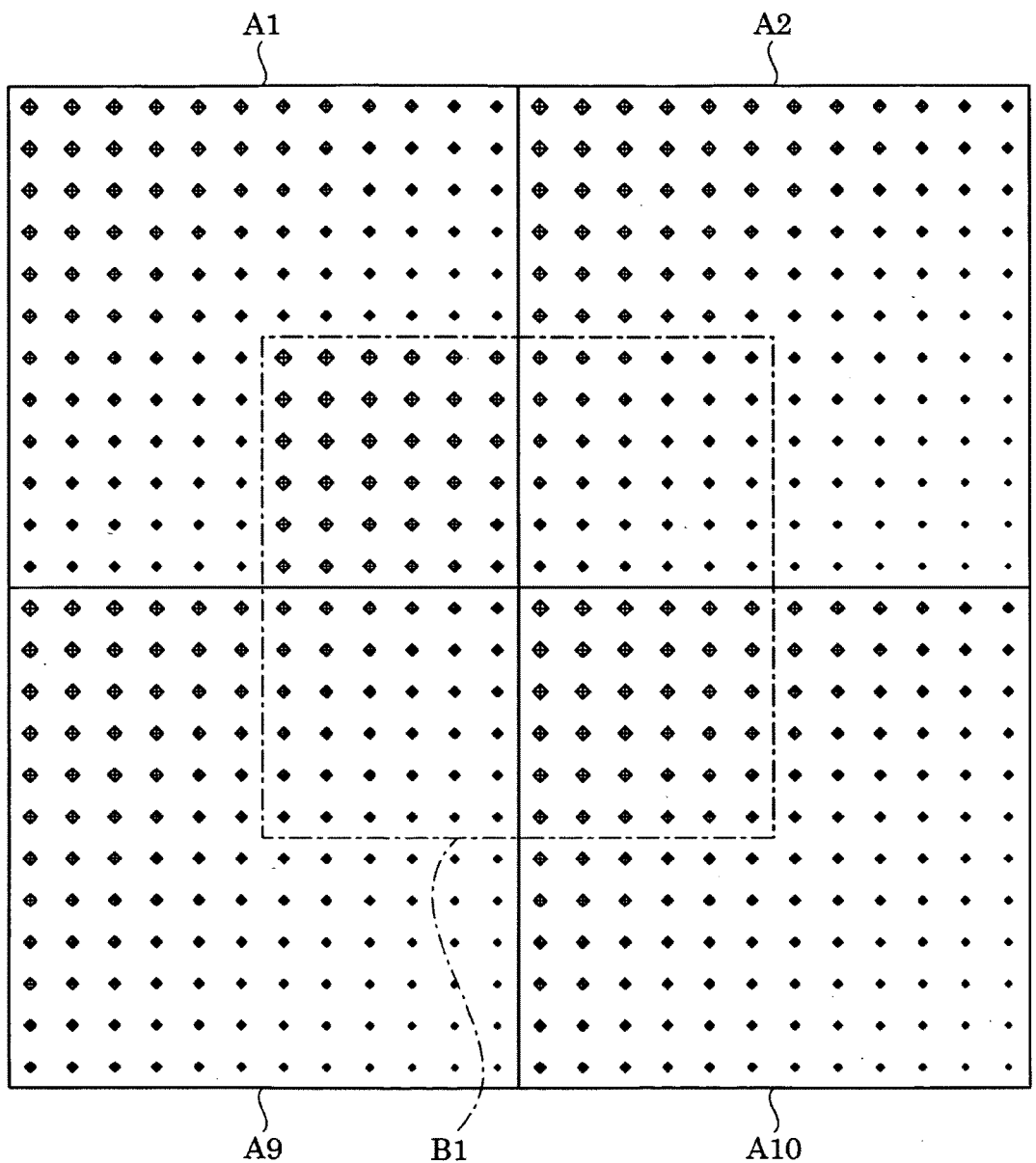
FIG. 8 is an enlarged plan view illustrating the light guide plate.
Figure 13:
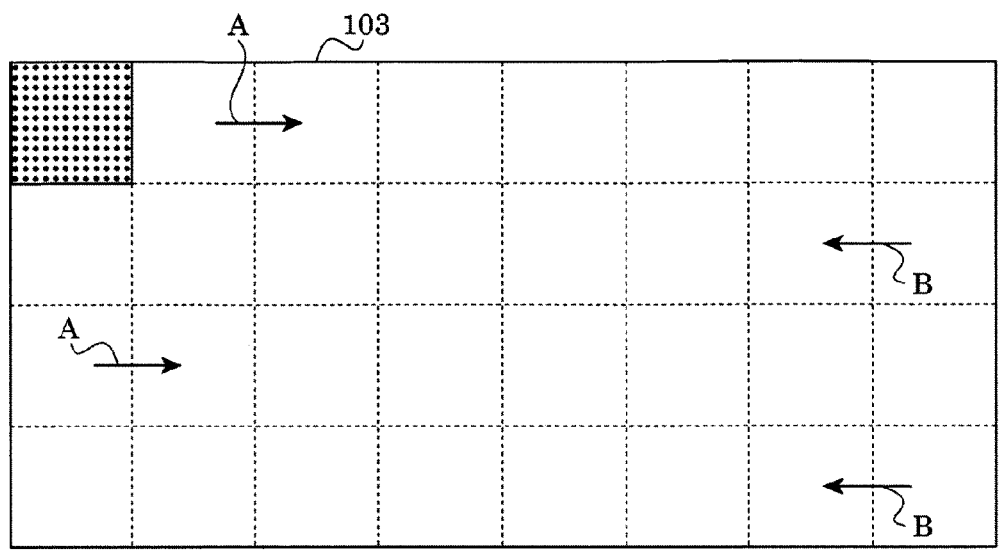
FIG. 13 is a plan view illustrating a method for manufacturing the light guide plate.
Figure 13:
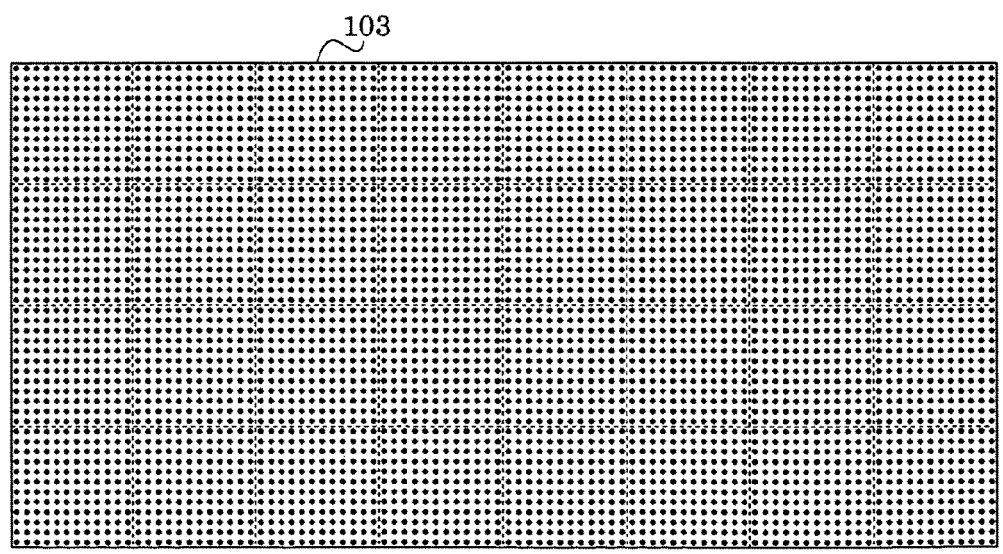

More specifically, the ultrasonic process horn 101 executes the process while moving in such a manner that the recessed portions 11 to be newly formed are adjacent to the recessed portions 11 already formed as illustrated in FIG. 13. The ultrasonic process horn 101, thereafter, performs the process of adjusting the sizes of the recessed portions 11. Herein, the ultrasonic process horn 101 moves to the position not only different from the position used in a case of forming the recessed portions, but also in such a manner that the process dots overlap the recessed portions 11 already formed. For example, the ultrasonic process horn 101 forms a group of the recessed portions 11 in regions, assuming A1 through A32, as illustrated in FIG. 6 during formation of the recessed portions 11. The group of the recessed portions 11 refers to as a collection of one hundred forty four (144) recessed portions 11 formed where the ultrasonic process horn 101 contacts the light guide plate workpiece 9 once. That is, in a case where the recessed portions 11 are formed on the surface of the light guide plate workpiece 9, the ultrasonic process horn 101 performs the forming process for thirty two (32) times. Thereafter, the ultrasonic process horn 101 moves to a position, for example, the axis of the ultrasonic process horn 101 moves to the position above intersection points of border lines for the region A1, region A2, region A9, and region A10 provided in the corner vicinity of the light guide plate workpiece 9. Accordingly, each of the process dots is positioned directly above the recessed portions 11 inside the regions A1, A2, A9, and A10. The ultrasonic process horn 101 moves downward and contacts the light guide plate workpiece 9, so that the size of the recessed portions 11 are increased using the ultrasonic waves. Herein, the recessed portion or portions 11 to be increased in size are the recessed portions 11 having sizes which are smaller than an appropriate size to be formed. Here, the group of the recessed portions 11 is formed in a region B1 by the ultrasonic process horn 101. The region B1 is formed in such a manner as to be shifted in an amount equivalent to half of a width or a height of any of the regions A1, A2, A9, and A10, and in such a manner as to be evenly across the regions A1, A2, A9, and A10. Similarly, the ultrasonic process horn 101 forms regions B2 through B21. The regions B1 through B21 are formed in such a manner as to overlap a portion of the respective regions A1 through A32 as illustrated in FIG. 7 and FIG. 8.

Figure 9:
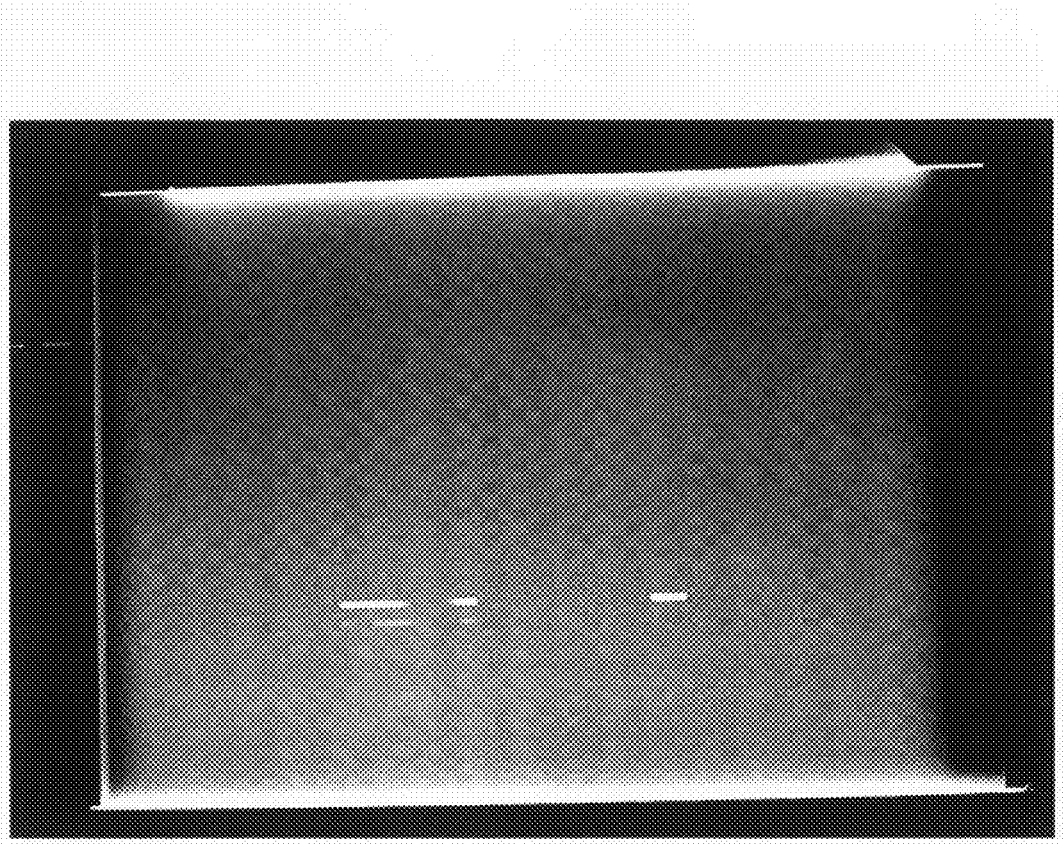
FIG. 9 is a photograph illustrating a state that the light guide plate emits the light.

Accordingly, the light guide plate 3 is formed as described above. When the incident light is entered into the end surface of the light guide plate 3, the light guide plate 3 emits the light as illustrated in FIG. 9. Here, FIG. 9 is a photograph showing a state in which the diffusion plate is disposed to the main surface of the light guide plate 3. A difference of light intensity between a bright portion and a dark portion is reduced in the light distribution of the light guide plate in FIG. 9 compared to that in the light distribution of the light guide plate 3 in FIG. 14. According to conventional technology, each of the recessed portions 11 is unevenly formed in size during formation of the recessed portions 11, and therefore, a portion irradiated with the light deflected by the recessed portion 11 having a smaller size compared to other recessed portions 11 becomes dark, and a portion irradiated with the light deflected by the recessed portion 11 having a relatively large size becomes relatively bright. With this mechanism, the light guile plate 3 has the surface having the unevenness generated thereon according to the conventional technology. In a case of using the light guide plate 3 according to the present invention, however, the size of the recessed portions 11 are adjusted, thereby eliminating the recessed portion 11 having the relatively small size. Accordingly, the present invention can reduce the unevenness of the light emitted from the light guide plate 3.

The diffusion plate 5 diffuses the light emitted from the main surface of the light guide plate 3. The diffusion plate 5 is made of, for example, polycarbonate resin, and is formed in a plate shape. The diffusion plate 5 has a main surface having a size substantially the same as the size of the main surface of the light guide plate 3. The diffusion plate 5 thus formed is disposed in such a manner that one main surface thereof is disposed in facing to the main surface of the light guide plate 3. When the incident light emitted from the light guide plate 3 is entered into the one main surface of the diffusion plate 5, the diffusion plate 5 diffuses the light to emit from another main surface. Therefore, the another main surface of the diffusion plate 5 uniformly emits the light.

The display plate 7 is made of a plastic material having a prescribed translucency. The display plate 7 has a main surface on which prescribed information is printed. The display play 7 is disposed in such a manner that one main surface thereof is opposite to the another main surface of the diffusion plate 5. When the light diffused in the diffusion plate 5 is entered into the one main surface of the display plate 7, the incident light passes through the display plate 7, so that the another main surface of the display plate 7 emits the light. Therefore, the information printed on the display plate 7 enhances visibility thereof.

Such a light emitting sign 1 includes a light emitting diode (LED) array formed adjacent to one end surface thereof in addition to the above structure. Herein, the LED array may be formed along the one end surface of the light guide plate 3, or may be arranged along two end surfaces disposed opposite to each other. In a case where the LED array is formed along the one end surface of the light guide plate 3, a reflection plate may be disposed to another end surface opposite to the one end surface. Therefore, the light emitting sign 1 can maintain the light intensity thereof. Moreover, in a case where the light emitting sign 1 is, for example, hanged from ceiling, the LED array may be formed along the end surface corresponding to an upper side of the light guide plate 3. Accordingly, the LED array can be easily wired, and various devices are not necessarily disposed to the end surface corresponding to a bottom side of the light guide plate 3.

According to an experiment conducted by inventors and others, the luminance of the light emitted from the light guide plate having the recessed portions formed on the one main surface was found to be greater than or equal to approximately six hundred (600) Candela. More specifically, the inventors and the others used the light guide plate made of acrylic resin having a width of 1000 mm, a height of 600 mm, and a thickness of 8 mm, and arranged one hundred eight (108) LED elements along both end surfaces in a width direction of the light guide plate. A pitch between each of the LED elements had 8.2 mm. Such an LED array was applied with a current of 20 mA per LED element at a direct current voltage of 24 V. Herein, a relationship between a distance from a light source and the luminance was provided as illustrated in TABLE 1.

TABLE 1

| DISTANCE FROM LIGHT SOURCE | LUMINANCE(cd/m²) |
|---|---|
| 50 | 760 |
| 100 | 660 |
| 200 | 610 |
| 300 | 580 |
| 400 | 590 |
| 500 | 600 |
| 550 | 680 |

Accordingly, the first embodiment allows the luminance to be maintained at a certain level while reducing the unevenness of the light on a light emitting surface of the light emitting sign 1.

According to the embodiment described above, the light guide plate 3 has the recessed portions 11 formed on only one side thereof. However, the light guide plate 3 may have the recessed portions 11 formed on both main surfaces thereof.

Figure 10:
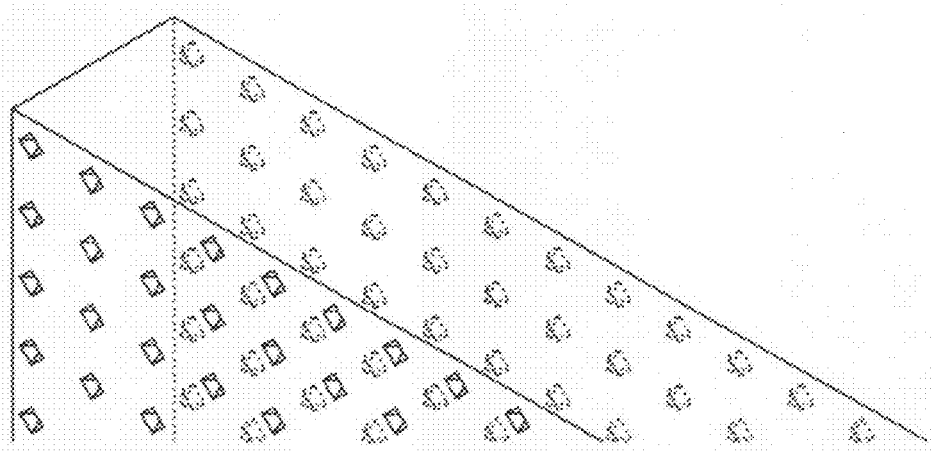
FIG. 10 is an enlarged perspective view illustrating the light guide plate.
Figure 11:
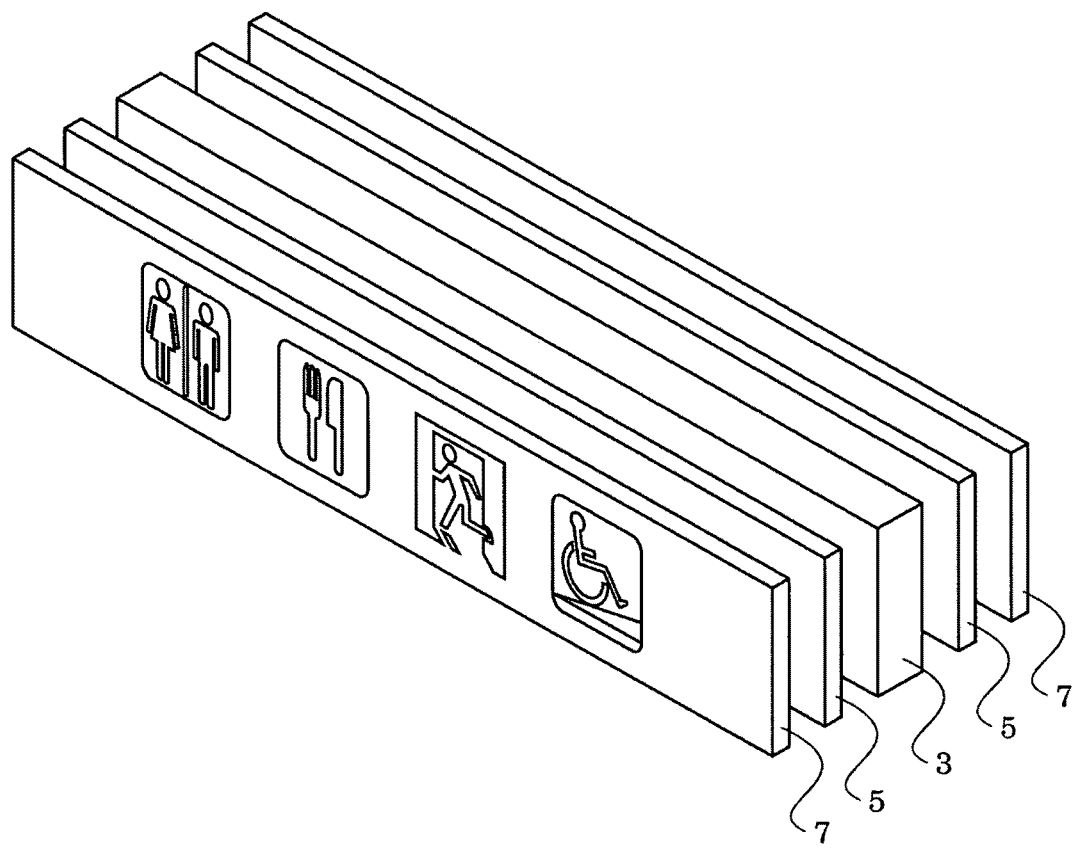
FIG. 11 is a perspective view illustrating the light emitting sign.

In such a case, after the recessed portions 11 are formed and adjusted on one main surface of the light guide plate 3, the light guide plate workpiece is inverted to form and adjust the recessed portions on another main surface of the light guide plate as similar to the one main surface. Accordingly, the recessed portions are uniformly formed on both main surfaces of the light guide plate as illustrated in FIG. 10. The diffusion plate and the display plate sandwich the light guide plate including the recessed portions formed and adjusted on the both main sides thereof. Accordingly, the light emitting sign capable of displaying the prescribed information in both directions can be formed as illustrated in FIG. 11.

According to an experiment conducted by inventors and others, the luminance of the light emitted from the light guide plate having the recessed portions formed on the both main surfaces was found to be greater than or equal to approximately three hundred (300) Candela. Particularly, the inventors and the others used the a light guide plate made of acrylic resin having a width of 1380 mm, a height of 270 mm, and a thickness of 8 mm, and arranged one hundred sixty (160) LED elements along one end surfaces in a width direction of the light guide plate. A pitch between each of the LED elements was 8.25 mm. A reflection plate was formed on another end surface in the width direction. Such an LED array was applied with a current of 20 mA per LED element at a direct current voltage of 24 V. Herein, a relationship between a distance from a light source and the luminance, and a relationship between the distance from the light source and the illuminance were provided as illustrated in TABLE 2.

TABLE 2

| DISTANCE FROM LIGHT SOURCE | LUMINANCE(cd/m²) | ILLUMINANCE(LUX) |
|---|---|---|
| 50 | 400 | 1330 |
| 100 | 370 | 1210 |
| 150 | 330 | 1080 |
| 200 | 305 | 1040 |
| 230 | 320 | 1100 |

Accordingly, in a case where the diffusion plates were disposed to the both main surfaces of the light guide plate, each surface of the diffusion plates had the luminance of at least three hundred (300) Candela. Therefore, the present invention can reduce occurrences of the unevenness and can obtain sufficient luminance as the light emitting sign in a case where the light is emitted form the both main surfaces of the light guide plate.

The present invention has been described above with regard to the particular embodiment. However, the present invention is not limited thereto and it must be understood that the present invention encompasses all modifications possible not departing from the scope of the invention.

What is claimed is:

1. A method for manufacturing a light guide plate emitting, from a main surface thereof, incident light entered from an end surface thereof, the method comprising the steps of:
    forming a recessed portion group, having a plurality of recessed portions deflecting a traveling direction of the incident light entered from the end surface, by allowing a prescribed ultrasonic process horn to contact the main surface of the light guide plate; and
    adjusting sizes of the plural recessed portions forming the recessed portion group to be substantially uniform by allowing the ultrasonic process horn to contact the recessed portion group formed on the main surface of the light guide plate by the forming step.

2. The method for manufacturing the light guide plate according to claim 1, wherein the ultrasonic process horn includes a plurality of process dots having shapes corresponding to each of the plural recessed portions, and
    wherein the adjusting step allows a portion of the plural process dots to contact the light guide plate in such a manner so as to overlap a portion of the recessed portions formed in the forming step.

3. A method for manufacturing a light guide plate emitting, from a first main surface, incident light entered from an end surface thereof and a second main surface thereof, the method comprising the steps of:
    forming a first recessed portion group, having a plurality of recessed portions deflecting a traveling direction of the incident light entered from the end surface, by allowing a prescribed ultrasonic process horn to contact the first main surface of the light guide plate, as a first forming step;
    adjusting sizes of the plural recessed portions forming the first recessed portion group to be substantially uniform by allowing the ultrasonic process horn to contact the first recessed portion group formed by the forming step on the first main surface of the light guide plate, as a first adjusting step;
    forming a second recessed portion group, including a plurality of recessed portions deflecting a traveling direction of the incident light entered from the end surface, by allowing the ultrasonic process horn to contact the second main surface of the light guide plate, as a second forming step; and
    adjusting sizes of the plural recessed portions forming the second recessed portion group by allowing the ultrasonic process horn to contact the second recessed portion group formed by the second forming step on the second main surface of the light guide plate, as a second adjusting step.

4. The method for manufacturing the light guide plate according to claim 3, wherein the ultrasonic process horn includes a plurality of process dots having shapes corresponding to each of the plural recessed portions,
    wherein the first adjusting step allows a portion of the plural process dots to contact the light guide plate in such a manner so as to overlap a portion of the plural recessed portions forming the first recessed portion group formed in the first forming step, and
    wherein the second adjusting step allows a portion of the plural process dots to contact the light guide plate in such a manner so as to overlap a portion of the plural recessed portions forming the second recessed portion group formed in the second forming step.

* * * * *